June 14, 1927.  A. H. SIMMONS  1,632,630

WAFFLE IRON

Filed March 25, 1924

Inventor:
Albert H. Simmons, by

His Attorney

Patented June 14, 1927.

1,632,630

UNITED STATES PATENT OFFICE.

ALBERT H. SIMMONS, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

WAFFLE IRON.

Application filed March 25, 1924. Serial No. 701,851.

My invention relates to improvements in waffle irons and the like and has for its object the provision of a simple and reliable connection for the cooking plates of such devices.

More specifically my invention has for its object a pivotal connection for the cooking plates of waffle irons and the like in which the parts of the connection are enclosed and thus protected from grease and other cooking materials, and which permits the plates to be taken apart easily for cleaning and other purposes.

Figure 1:
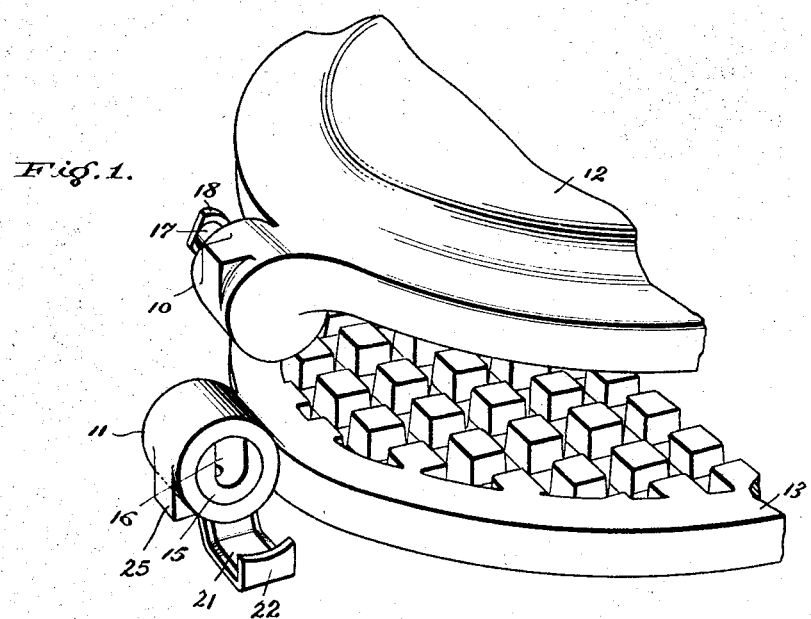
Figure 2:
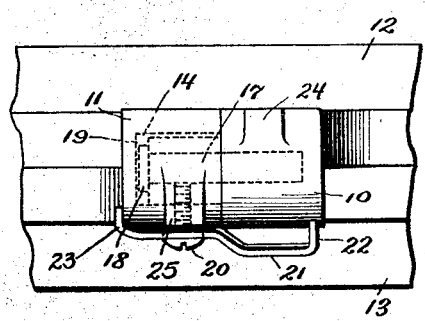
Figure 3:
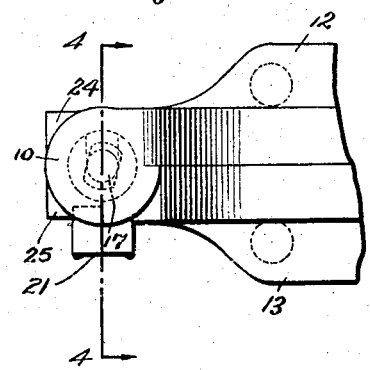
Figure 4:
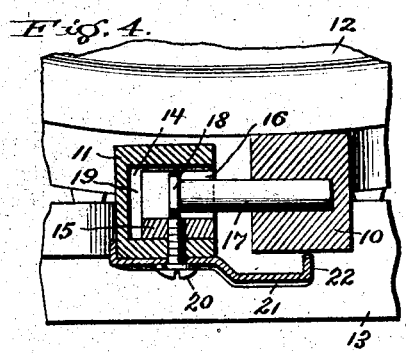

For a more complete understanding of my invention reference should be had to the accompanying drawing in which Fig. 1 is a fragmentary perspective view showing a pivotal connection for waffle iron plates embodying my invention; Fig. 2 is a fragmentary end elevation view; Fig. 3 is a fragmentary side elevation view taken along the line 4—4 of Fig. 3, looking in the direction of the arrows, showing the plates partly separated; while Fig. 4 is a sectional view.

Referring to the drawing, in one form of my invention I provide lateral lugs or extensions 10 and 11 on the waffle iron plates 12 and 13 which are to be pivotally connected so that they can be moved with relation to each other to permit the insertion and removal of the cooking material. Ordinarily one of the plates, for example the lower plate 13 is mounted in a horizontal position on a stand or support, while the upper plate 12 is pivotally movable to open and close the waffle iron in a well known manner. As shown in Fig. 2 the extensions 10 and 11 are so disposed on the plates as to engage at their sides when the plates are connected together. The pivotal connection for the plates is provided between these two extensions. In shape, the extensions are substantially cylindrical with respect to the pivot axis of the plates.

In one of the extensions, for example the extension 11 on the lower plate, a laterally extending recess 14 is provided, which is adjacent and normally closed by the extension 10. In the recess 14 is a bushing 15 provided with a slot 16 extending longitudinally of the recess. This bushing forms a bearing for a laterally extending pivot or pin 17 which is secured to the adjacent extension 10. The pin 17 is provided with a head 18 which is flattened or has two opposite segments cut away so that the head is substantially the same shape as the groove 16 but slightly smaller whereby it can be slipped freely through the groove in connecting and disconnecting the plates. The bushing 15 is slightly shorter than the recess 14 and is secured in the recess 14 with its inner end spaced from the inner end of the recess so as to leave a space 19 for the head 18. It will be observed that the head 18 engages the shoulder formed by the inner end of the bushing, thus locking the plates together. The pin 17 is free to move in the slot 16 in an upward direction, however, to allow the upper plate to rise with the waffle and adjust itself thereto as the waffle expands in cooking.

As shown, the bushing 15 may be secured in place by means of a screw 20 which also secures a stop and supporting member 21 to the extension 11. This member extends parallel with pin 17 below the extension 10 and has its end 22 adjacent the outer side of extension 10 turned upward and cut circular so as to form an auxiliary bearing or rest for the extension 10 and support part of the weight of the plate 12 when it is lifted. The opposite end 23 of member 21 is turned upward into engagement with the side of extension 11 to prevent turning of member 21 about screw 20. If the supporting member 21 were not provided, there would be a tendency for the pin 17 to tilt upward in the slot 16. The lower side of the extension 11 is provided with a flat surface against which the member 21 is clamped securely by the screw 20. A projection 24 is provided on the upper rearward side of the extension 10 and a similar projection 25 is provided on the lower rearward side of extension 11. These projections engage the edges of the plates respectively when plate 12 is swung upward and over about its pivot to a substantially horizontal position, bringing plate 12 to rest in this position. That is, the plate 12 is brought to rest in full open position, which is substantially horizontal, by the engagement of projection 24 with the edge of plate 13 and the engagement of projection 25 with the edge of plate 12.

It will be observed that this pivotal connection permits the plates to be taken apart easily for cleaning or other purposes. In order to take the plates apart, the upper plate 12 is raised to bring the sides of the head 18 into alinement with the sides of the groove 16 after which the plate 12 is lifted slightly until the lower side of the head is in alinement with the bottom of the groove whereupon plate 12 may be disengaged by moving it to one side to withdraw pin 17 from the bushing, as shown in Fig. 4. The flat sides of the head 18 are preferably disposed so that the plate 12 cannot be removed when in either closed or full open position. As shown in Fig. 3, the plate 12 must be moved about its pivot to an intermediate position in order to bring the flat sides of the head into alinement with the sides of the groove.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A pivotal connection for waffle iron plates and the like, comprising extensions on said plates, one of said extensions being provided with a recess, a bushing secured in said recess in spaced relation with the inner end thereof, and a pin on the other extension extending through said bushing and locking over the inner end thereof.

2. A pivotal connection for waffle iron plates and the like, comprising extensions on said plates, one of said extensions being provided with a recess, a bushing secured in said recess in spaced relation with the inner end thereof, a pin on the other extension rotating on said bushing, and a head on said pin locking over the inner end of said bushing.

3. A releasable pivotal connection comprising members arranged side by side, one of said members being provided with a recess, a pin carried by the other member extending into said recess, said recess being provided with a bottom wall forming a bearing for said pin, and means for locking said pin against endwise movement in said recess except when said members are in a predetermined angular relation when said pin may be withdrawn endwise to disconnect said members.

4. A pivotal connection comprising members arranged side by side, one of said members being provided with a laterally extending recess, a laterally extending pin secured to the other member extending into said recess, said recess being provided with a bottom wall forming a bearing for said pin, and means for locking said pin against endwise movement in said recess except when said members are in a predetermined angular relation with respect to each other when said pin may be withdrawn endwise to disconnect said members.

5. A releasable pivotal connection comprising members arranged side by side, one of said members being provided with a laterally extending recess and an enlarged space at the end of said recess, a pin on the other member extending into said recess, said recess being provided with a bottom wall forming a bearing for said pin, and a head on said pin arranged to rotate in said space.

6. A pivotal connection for waffle iron plates and the like comprising extensions on said plates arranged side by side, one of said extensions being provided with a laterally extending slot and an enlarged space at the end of said slot, a laterally extending pin on the other extension extending into said slot, said recess being provided with a bottom wall forming a bearing for said pin, and a head on said pin arranged to rotate in said space, said head being flattened so as to pass through said slot when said plates are in a predetermined angular relation with respect to each other.

7. A pivotal connection for waffle iron plates and the like, comprising extensions on said plates arranged side by side, one of said extensions being provided with a laterally extending recess, a slotted bushing secured in said recess in spaced relation with the inner end of said recess, a laterally extending pin on the other extension extending through said bushing and rotating thereon, and a head on said pin locking over the inner end of said bushing, said head being flattened so as to pass through said bushing when the plates are in a predetermined relation to effect the connection and disconnection of said plates.

8. A pivotal connection for waffle iron plates and the like, comprising extensions on said plates, one of said extensions being provided with a recess, a pin on the other extension rotating in said recess upon relative movement of the plates, and an auxiliary supporting member secured to one of said extensions on which the other extension rotates.

9. A pivotal connection for waffle iron plates and the like, comprising extensions on said plates, one of said extensions being provided with a recess, a laterally extending pin on the other extension rotating in said recess upon relative movement of the plates, and a laterally extending member secured to said first extension and forming an auxiliary support for the second extension.

10. A pivotal connection for waffle iron plates and the like, comprising extensions on said plates, one of said extensions being provided with a laterally extending recess, a slotted bushing secured in said recess in spaced relation with the inner end of said recess, a laterally extending pin on the other extension extending through said bushing and rotating thereon upon relative movement of the plates, a head on said pin locking over the inner end of said bushing, said head being flattened so as to pass through said bushing when the plates are in a predetermined relation to effect the connection and disconnection of said plates, a laterally extending member secured to said first extension and forming an auxiliary support for the second extension, and projections on said extensions arranged to engage said plates and limit the relative movement thereof.

In witness whereof, I have hereunto set my hand this 21st day of March, 1924.

ALBERT H. SIMMONS.